United States Patent

[15] 3,699,577

Shadle

[45] Oct. 17, 1972

[54] METHOD AND SYSTEM OF SURVEILLANCE PROCESSING

[72] Inventor: Paul W. Shadle, Miraleste, Calif.

[73] Assignee: The United States of America as represented by the Secretary of the Air Force

[22] Filed: May 11, 1970

[21] Appl. No.: 48,761

[52] U.S. Cl.......343/112 R, 250/83.3 H, 343/100 ST
[51] Int. Cl................................................G01s 5/00
[58] Field of Search....250/83.3 H, 83.3 HP; 343/7.7, 343/100 ST, 112

[56] References Cited

UNITED STATES PATENTS 3,248,734   4/1966   Weiss et al.........250/83.3 H X
3,542,477   11/1970  Grey et al. ........250/83.3 H X
3,560,971   2/1971   Alsberg et al..............343/6 X

*Primary Examiner*—Benjamin A. Borchelt
*Assistant Examiner*—Richard E. Berger
*Attorney*—Harry A. Herbert, Jr. and Julian L. Siegel

[57] ABSTRACT

Surveillance of missile tracks is obtained by a satellite having a series of sensors that activate an image storage tube which is periodically slit scanned. The scan data is processed to determine when the length of the series of images is sufficient to represent a missile track and the information is transmitted to a ground control station and a ground user station. By transmitting signals the control station controls the threshold levels, blanking, and the data processing program. The user station combines the data from the satellite and the ground station to determine the location of the missile and predict its trajectory.

3 Claims, 4 Drawing Figures

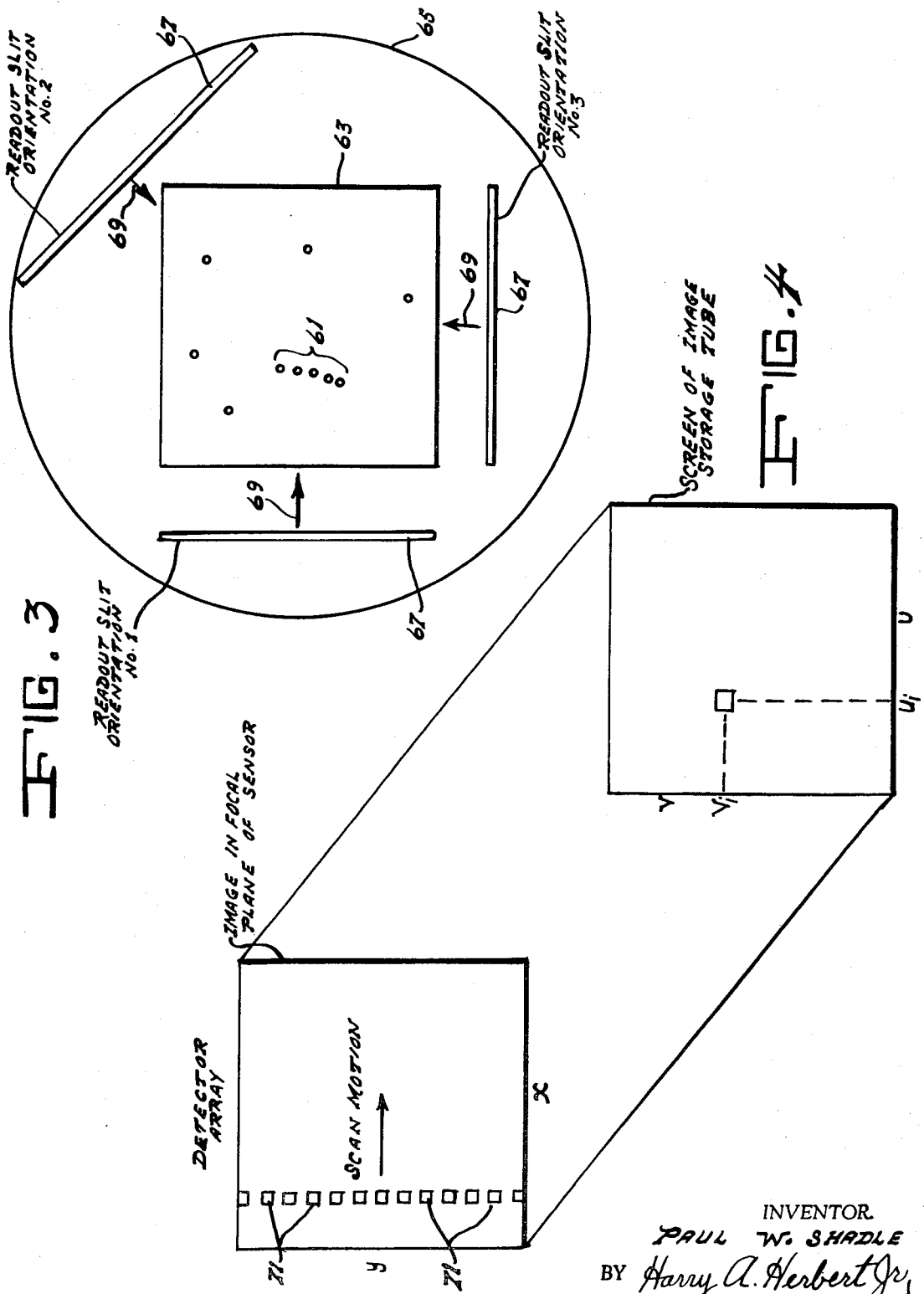

METHOD AND SYSTEM OF SURVEILLANCE PROCESSING

BACKGROUND OF THE INVENTION

In the past in missile surveillance the practice has been to threshold a sensor output so that only high intensity signals are passed on to a digital computer which then attempts to relate each signal pulse to others in its vicinity. The computer finally tests related pulses with certain algorithms to determine the likelihood that these points represent a missile track. Such a process requires a large computer, which prohibits its use in the satellite, and the necessity of distributing the data to several ground stations requires multiple computer installations, or communications from a central station to each ground station.

In the present invention the data is processed in two-dimensional form by a system that can be carried in the satellite. Missile tracks are recognized while in two-dimensional form, thus discriminating against single point noise returns. Clustered returns, such as from clouds, can trigger the track recognition circuits also, but these can be eliminated by automatic discrimination of area blanking from the ground upon command.

SUMMARY OF THE INVENTION

The surveillance sensor scans at a high rate, for example in excess of $10^6$ elements per second, but produces few high level signals. A requirement peculiar to this system is the desirability of performing most of the data processing in orbit since the data has to be transmitted to many user stations simultaneously.

The data produced by such a surveillance sensor consists of occasional single, high intensity pulses due to noise sources internal to the censor system such as bit errors and impulse noise, clustered high intensity pulses due to background caused by high clouds illuminated by the sun seen under low scattering angle conditions, and high intensity signal pulses from the rocket exhaust of the missiles. The combination of the missile motion and repeated scanning by the sensor produces tracks if the sensor output is presented on a two-dimensional display. If no track is detected after a set of scans by the slit aperture, the image storage tube is erased.

The system of the present invention makes it possible to perform track detection in orbit in which command changes can be made in processing parameters to adapt to special conditions. For instance, blanking of regions of heavy background or noisy detectors may be necessary. It may also be advantageous to control the frequency of readout to adapt to specific missile types or unusual noise conditions.

It is therefore an object of this invention to provide a method of processing missile tracks by a device carried aboard a satellite.

It is still another object to provide an improved method of tracking missiles which discriminates against single point noise returns.

These and other advantages, features and objects of the invention will become more apparent from the following description taken in connection with the illustrative embodiment in the accompanying drawings.

DESCRIPTION OF THE DRAWINGS

FIG. 3 is a diagram showing the image tube in connection with the missile tracks; and FIG. 4 is a diagram showing the relationship of the sensor array and the storage tube.

DETAILED DESCRIPTION OF THE PREFERRED EMBODIMENT

Figure 1:
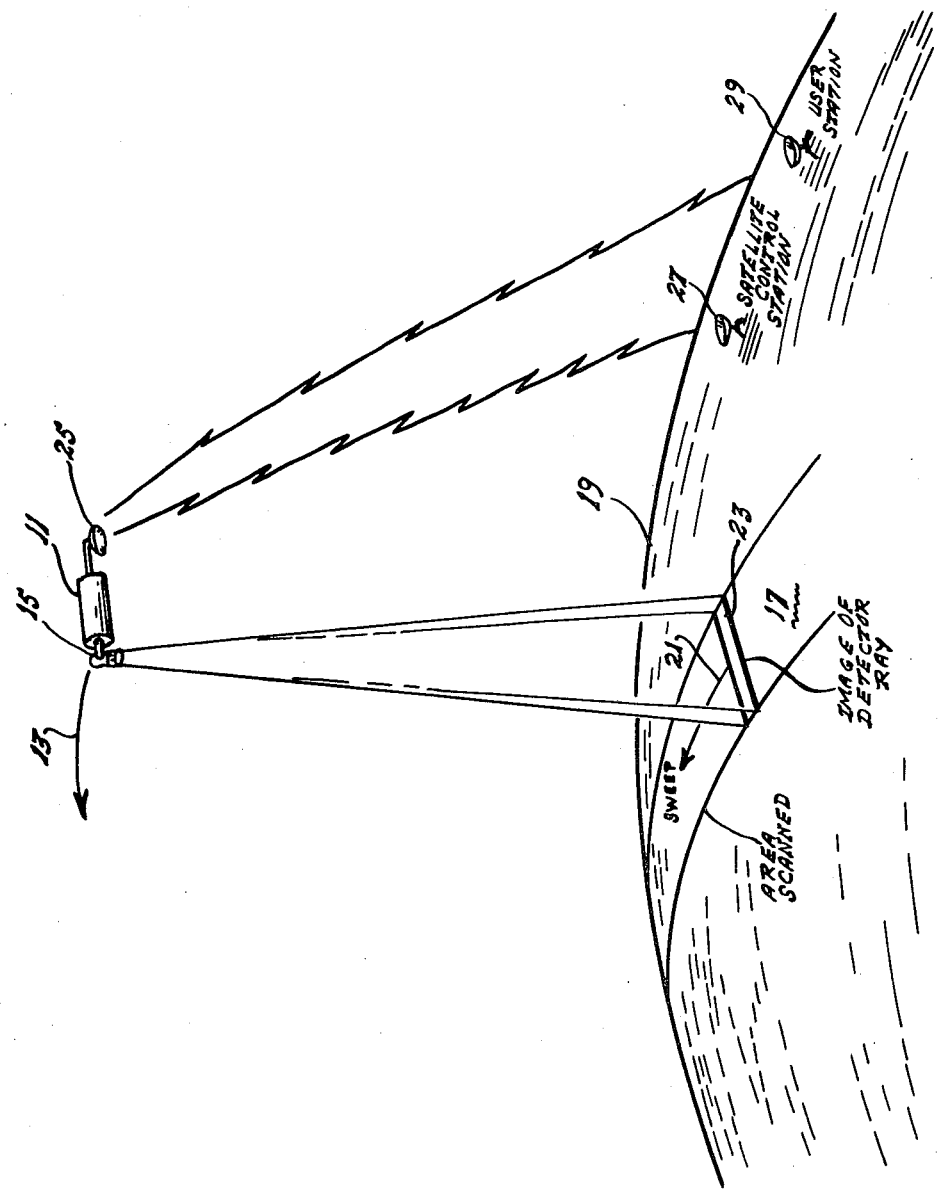
FIG. 1 is a pictorial diagram showing the surveillance satellite orbiting the earth in connection with ground stations.

Referring to FIG. 1, there is shown satellite 11 in an orbit represented by arrow 13. Sensor 15 scans area 17 of earth 19 in the direction shown by arrow 21 with area 23 representing the instantaneous view of the sensor. Antenna 25 transmits data to satellite control station 27 and user station 29. On satellite 11 are also located a data processor and a data transmitter and the usual support systems. Orbit 13 is so chosen that the sensor can survey the desired areas and data can be transmitted to ground stations 27 and 29.

There are two kinds of ground stations: a satellite control station and a user station. A satellite control station keeps track of the exact satellite position and altitude, and the sensor and processor status, and also initiates commands to the satellite to control the housekeeping functions. The sensor and data processing operations involve adjustment of threshold levels, blanking of noisy areas or detectors, and changes to the data processing program. The satellite control station can also send basic data on satellite location and sensor calibration to the user stations via the satellite.

Within satellite 11 the output data of sensor 15 which can occupy a bandwidth of up to 40 MHz is processed for missile tracks. If tracks are detected, as will be explained later, the line-of-sight angles to these tracks are encoded and transmitted to both control station 27 and user station 29. User station 29 combines data from satellite 11 with the data from satellite control station 27 to calculate predicted trajectories of the missiles observed. In a more complete operational system at least two or more satellites would be located so as to observe any particular missile launching. User station 29 would then combine the data from all the satellites to obtain precise location of a missile trajectory.

The central element required for the satellite detection is a two dimensional type of storage sensor, such as the ITT Storage Image Tube Type FW–231, or the RCA Electrostatic Image Tube. This invention is not tailored to a specific tube, but can use any two-dimensional image tube which permits a long storage (up to 100 seconds) and which allows successive images to be stored without destroying earlier images already in storage. The final image will then be a point-for-point sum of the images read in.

The tube should also permit read out without destroying the image and permit erasure upon application of a suitable signal.

Figure 2:
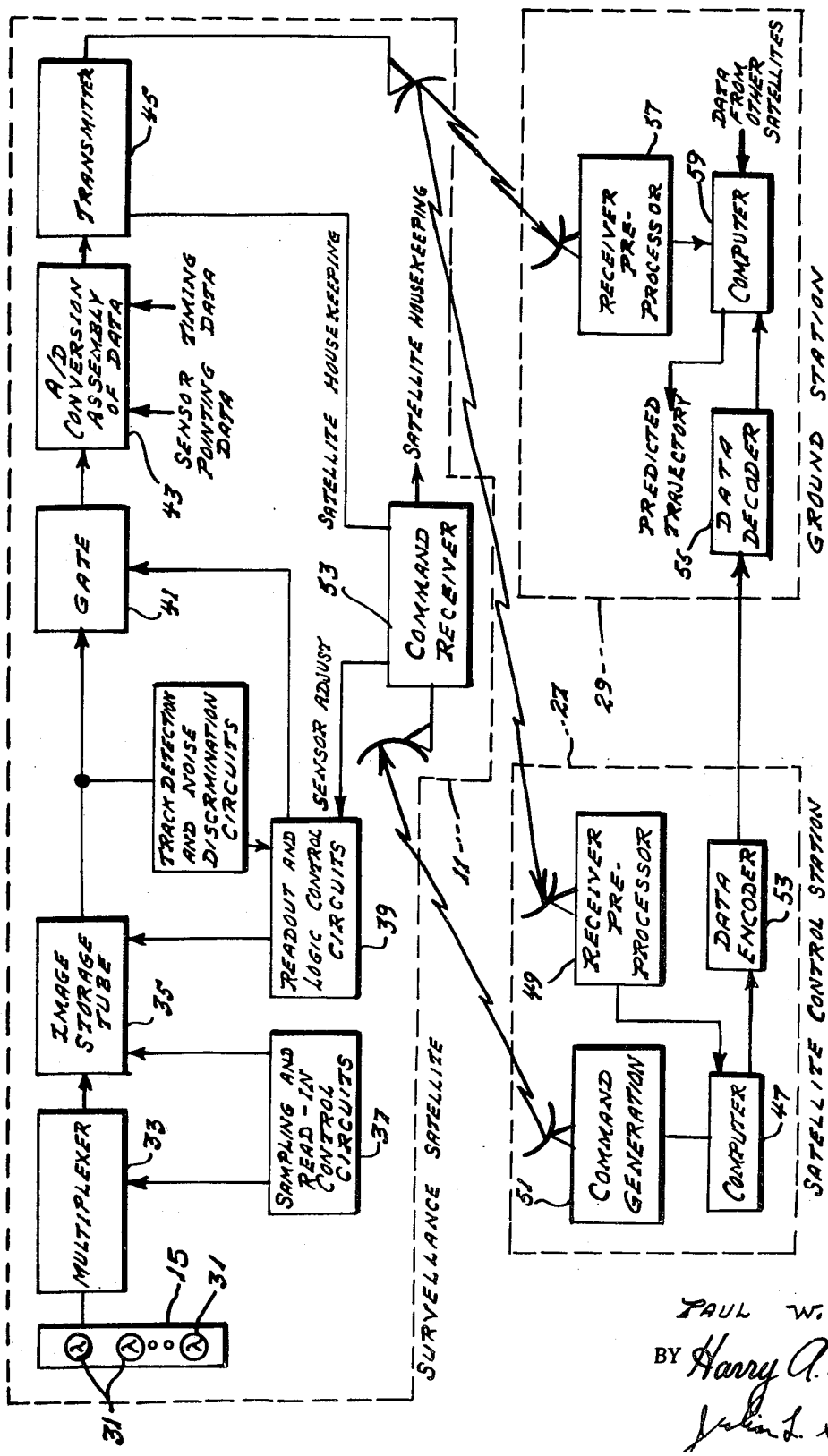
FIG. 2 is a block diagram showing an embodiment of the invention.

The surveillance sensor 15 scans a raster containing a multiplicity of n elements in a given time and then repeats the scan. A detailed functional block diagram of the system is shown in FIG. 2. Sensor 15 can contain up to 2,000 individual detectors or elements 31. The output of these detectors is multiplexed by multiplexer 33 into a serial data stream and then read into image storage tube 35, as controlled by circuits 37A in real time, one frame after another in proper spatial registration. The data in image storage tub 35 is scanned at regular intervals, as controlled by control circuits 39, for missile tracks. If a missile track is found, the read out mode is switched using gate 41 and the data on the location of the track is read out of the storage tube, suitably encoded using analog to digital converter 43, assembled with sensor pointing and timing data, and sent to ground stations 27 and 29 by transmitter 45.

The function of the satellite control station is to perform the housekeeping functions for normal spacecraft functioning and sensor operation. These functions include: measuring preset position and attitude of the satellite, predicting future position and attitude, commanding spacecraft position or attitude changes, commanding sensor pointing changes, adjusting operating parameters of sensor and sensor data processing, computing calibration constants for sensor, and transmitting data, such as spacecraft position and attitude to the satellite for retransmission to the underground station.

Control station 27 contains computer 47 which is programmed to do the housekeeping work. Data is fed to computer 47 by receiver preprocessor 49 which receives the transmitted information from satellite 11. Computer 47 causes command signals to be generated by command control circuitry 51 which is transmitted to satellite 11. The commands are received by command receiver circuits 53 on satellite 11. Commands are fed to control circuits 39 and transmitter 45. The housekeeping data of computer 47 is also encoded by encoder 53 and fed to data decoder 55 of ground station 29. This information can be fed directly or can be transmitted to satellite 11 and retransmitted to ground station 29. Ground station 29 receives tracking data which is fed to receiver preprocessor 57 and then fed to computer 59 together with the housekeeping data. Computer 59 can then determine the predicted trajectory of the missile.

Referring to FIG. 3, when a target is observed by the surveillance sensor, a series of points 61 is generated forming a slightly curved line on raster 63 of face 65 of the storage tube. Readout device 67 with a slit-shaped aperture is caused to scan storage tube face 65 sweeping in a direction normal to the slit as shown by arrow 69. If the aperture is parallel to the track there will be a short intense signal on the read out beam. If the aperture is normal to the track, the output signal will be less intense but will persist for a longer time. The aperture can then sweep back and forth, and rotate incrementally in 45° steps after every few sweeps, the sweep direction always remaining normal to the aperture. If there is a track, there will be some orientation of the aperture when a long pulse will be generated indicating a track. This can be caused to trigger a threshold and initiate a detailed scan and transmission of data to the user.

The data is read into the image storage tube as it is received from the individual detectors. The readout of the image tube can be arranged in several ways. For clarity, one scheme is described.

After n surveillance sensor frames have been read in, the image is read out by the slit aperture 67 during the retrace time of the surveillance sensor. If a track is detected, the read out mode is switched to a detailed scan of the neighborhood of the track by a small symmetrical aperture. The location of the track is defined by the phase of the pulse detected by the slit aperture. Erasure can take place after this detailed scan or after the track is completed.

The detailed functioning of the image storage tube, the mechanism of storage, read in and read out, depends upon the particular tube selected. The one-to-one relationship between the image planes of the sensor and storage tube is illustrated in FIG. 4. A line of detectors 71 parallel to the $y$ direction is scanned across the image in the $x$ direction in the focal plane of the sensors. Read in beam in the image storage tube scans rapidly in the $v$ direction in synchronism with the sampling of the individual detectors in the $y$ direction. In addition, the beam sweeps in the $u$ direction in synchronism with the scan motion of the detector array; thus each element $u_i$, $v_i$ in the image storage tube corresponds to the scan location detector element $y_i$. The motion of the detector array from a starting point until it again passes the same point while moving in the same direction, is a frame.

In FIG. 3 the image is presented as it might appear after at least six frames have been read in. There are a number of isolated points in the display as well as one missile track. In order to detect the presence of such tracks the slit-shaped aperture shown is caused to scan the image. Slit aperture 67 scans across image raster 63 successively in three orientations as shown. For the geometry shown, the apparent length of the track will be least when slit 67 is in orientation No. 1, and the length will be greatest when slit 67 is in orientation No. 3. The noise pulses, if isolated, will only produce short pulses, regardless of the orientation of the slits. Thus, a long pulse resulting from the images appearing through slit 67 indicates the presence of a track, and the time at which slit 67 passes over the track indicates its approximate position. This information is then utilized to switch the read out mode to a small, symmetrical aperture which is caused to scan a small raster in the vicinity of the track. Data continues to be read in as a track is read out, thus giving information as to the direction in which the track advances. The display is erased after the termination of the track, or after a certain number of frames if no track is detected.

It is not necessary to transmit to a ground station until a track is detected. Even when a track is detected, only a small number of elements need be transmitted.

In severe background or clutter clusters of background returns can be recognized by the pulse shapes obtained during the slit scan mode. Additional logic circuits can be incorporated to blank out such an area. This will reduce the coverage during a period of intense background but would occur even if human operators are employed.

I claim:

1. A system for tracking and predicting trajectories of missiles comprising:
    a. a satellite having 1. means for sensing signals emanating from missiles,
2. a multiplexer fed by said means,
3. an image storage tube fed by the multiplexer,
4. means for scanning the image storage tube,
5. means for detecting the presence of a missile track from the output of the scanning means,
6. means for encoding the output of the detecting means, and
7. means for transmitting the output of the encoding means; and b. a ground station having
1. means for receiving signals from the satellite, and
2. means for computing the position and trajectory of the missiles.

2. A method of tracking missiles using an orbiting satellite and a ground station comprising:
a. sensing signals within viewing area of the satellite;
b. storing the sensed signals upon a storage raster; and
c. scanning the raster with a slit aperture in a direction perpendicular to the longitudinal direction thereof, the scanning being repeated from different orientations about the raster; and
d. detecting the sensed signals passing through the slit aperture, the time length of the detected signals and the orientation of the slit aperture being respectively indicative of a missile track and the direction thereof.

3. A method of tracking missiles according to claim 2 which further comprises:
a. transmitting the detected data to a ground station; and
b. computing the missile trajectory at the ground station.

* * * * *